Figure 1:
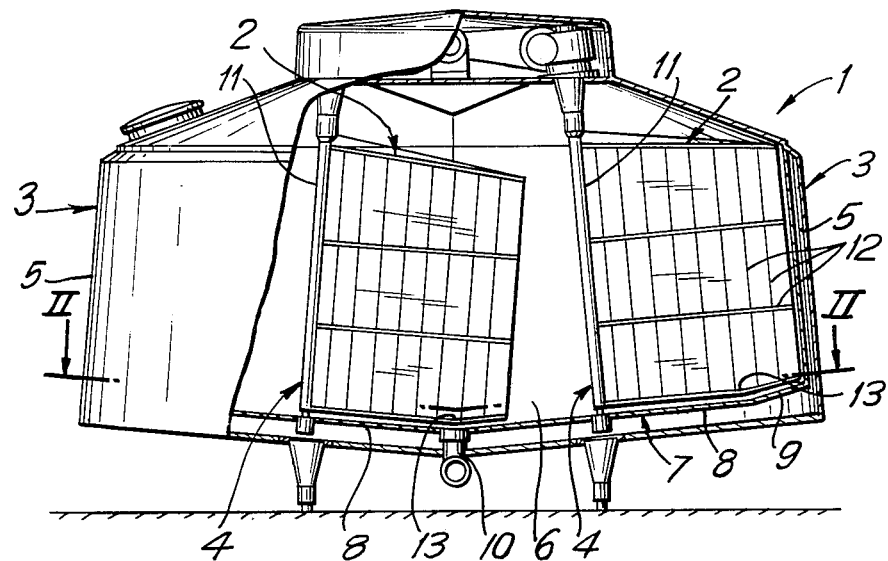

United States Patent [19]

Kostiainen et al.

[11] Patent Number: 4,612,853
[45] Date of Patent: Sep. 23, 1986

[54] CHEESE KETTLE

[75] Inventors: Lauri Kostiainen; Heikki Kauppi, both of Helsinki, Finland

[73] Assignee: MKT-Tehtaat Oy, Helsinki, Finland

[21] Appl. No.: 738,684

[22] Filed: May 28, 1985

[30] Foreign Application Priority Data

May 28, 1985 [FI] Finland .................................. 842133

[51] Int. Cl.$^4$ ......................... A01J 13/00; A01J 25/00
[52] U.S. Cl. ...................................... 99/461; 99/460; 366/292; 366/297
[58] Field of Search .................. 99/452, 453, 460–463, 99/465, 466, 348; 366/290, 291, 261, 292, 297, 298–301; 426/36, 582

[56] References Cited

U.S. PATENT DOCUMENTS 3,733,702  5/1973  Robertson et al. ................... 99/462
4,206,880  6/1980  Stanton ........................... 366/297 X

FOREIGN PATENT DOCUMENTS 27133   1/1955  Finland ........................... 99/462
854336  8/1981  U.S.S.R. ......................... 99/462

Primary Examiner—Timothy F. Simone
Attorney, Agent, or Firm—Toren, McGeady, Stanger, Goldberg & Kiel

[57] ABSTRACT

A cheese kettle (1) is used for the separation of whey from the cheese mix and the comminuting of the cheese mix into curd particles takes place. The cheese kettle (1) is composed of two side-by-side, substantially cylindrical parts (3), located so that they partly interpenetrate, and each provided with rotary tools (2) treating the cheese mix. It is essential that the cylindrical parts (3) of the kettle (1) are inclined towards each other so that their interpenetration increases in the upward direction. The kettle bottom (7), includes circular segments substantially at right angles to the axes (4) of the cylindrical parts (3), and slope towards the draining aperture (10) in the center of the bottom, whereby the kettle is emptied without any need to tilt it specifically, and the tools (2) in the kettle can be so shaped that their sides follow, during rotation, the bottom and sides of the kettle, whereby the cheese mix is given a complete mixing and comminuting treatment covering all parts of the kettle.

8 Claims, 2 Drawing Figures

U.S. Patent    Sep. 23, 1986    4,612,853

CHEESE KETTLE

The present invention concerns a cheese kettle consisting of two substantially cylindrical parts which partly interpenetrate so that the mantles of said parts, which have a circular arc-shaped cross section, constitute the sides of the kettle, while the bottom of the kettle is composed of substantially equivalent circular segments, and in which each of said cylindrical parts is provided with a rotating tool for treating the cheese mix, this tool being so shaped that the sides of the tool travel along the bottom and sides of the kettle during their rotation, in order to accomplish the complete treatment of the cheese mix.

Cheese kettles in which the whey is separated from the cheese mix and the cheese mass is comminuted into curd granules are usually vertical, cylindrical containers provided with one or several rotary tools mixing and comminuting the cheese mix. As the size of chese kettles has increased in the course of their development, this type of cylindrical kettle has gained unfavourably great height in view of the production of certain cheeses, such as Edam cheese for instance. The reason is the excessive pressure acting on the curd particles sinking to the kettle bottom. The problem cannot be solved by making the kettle lower and wider, because transporting a kettle like this from the factory to the dairy would be too inconvenient owing to its dimensions.

A solution to the above problem has been that the cheese kettle is constructed of two side-by-side, cylindrical parts so that the parts partially interpenetrate. In this way a cheese mix-processing unit has been obtained which can be made lower than a conventional cheese kettle without having to make any compromises regarding kettle size. made with a substantially level bottom, the tools moving in the kettle can follow the bottom and sides of the kettle so that the cheese mix is given a complete treatment in the kettle. However, the problem now arising is that when the curd particles are discharged from the kettle, and when the kettle is washed, it is difficult to empty the kettle completely. The draining aperture in the bottom of the kettle is usually placed on the margin of the kettle, implying that the kettle must be tipped in the direction of the aperture to have it completely emptied. This implies that the kettle has to be provided with a separate lifting mechanism to tilt it.

One solution for avoiding the problems associated with emptying the kettle is that the kettle is mounted permanently in inclined position. However, a drawback is then that the kettle cannot be filled to the brim and must instead be left somewhat lacking. Another solution is that the kettle bottom is made inclined so that it slopes towards the discharge aperture, most advantageously placed in the centre of one or the other circular segment. On the other hand, this design has the drawback that the tools moving in the kettle leave a dead area near the bottom of the kettle into which they do not reach and in which the cheese mix therefore receives no treatment.

The object of the present invention is to provide a cheese kettle which is composed of two side-by side, cylindrical parts which partly interpenetrate, and in which the above-mentioned drawbacks present in equivalent kettles of prior art have been avoided. While kettles of prior art are characterized in that their cylindrical parts are parallel, the kettle of the invention is in contrast characterized in that the cylindrical parts of the kettle are inclined towards each other so that their mutual penetration increases in the direction upwards from below.

When the bottom of the cheese kettle of the invention is composed of parts which are mainly perpendicular against the axes of the cylindrical parts of the kettle, also the bottom is inclined as a result of the inclination of said axes, whereby the kettle can be emptied through the draining aperture in the centre of the bottom without need to tilt the kettle. It is possible at the same time to shape the tools treating the cheese mix to be such that they follow the bottom and sides of the kettle without leaving any dead areas in the kettle where the cheese mix would miss the treatment.

Figure 2:
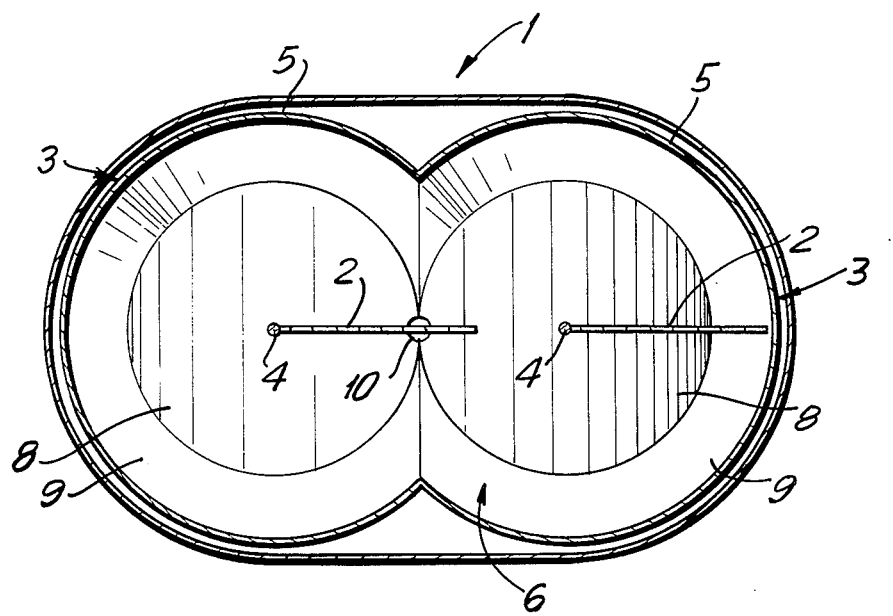

The invention is described in the following more in detail, reference being made to the drawing attached, wherein:

FIG. 1 presents a cheese kettle according to the invention, in elevational view and partly sectioned, and FIG. 2 presents the section II—II of FIG. 1.

In the figure is presented a cheese kettle 1, intended for precipitating the cheese mix and for comminuting it into curd particles with the aid of tools 2 moving in the kettle. The cheese kettle 1 consists of two side-by side, substantially cylindrical parts 3, which are located so as to partly penetrate into each other, and the axes 4 of which are inclined towards each other. The interpenetration of the parts 3 therefore increases from the bottom of the kettle 1 towards the upper part of the kettle. The parts 3 are mutually substantially similar and mirror images of one another.

Defining the cheese kettle 1 as being composed of cylindrical, partly interpenetrating parts 3 is understood to mean that the kettle comprises a coherent space 6 confined by the mantles 5 of said parts, in which the treatment of the cheese mix takes place, the cross sections of the mantles 5 in planes at right angles against the axes 4 of the parts being circular arcs. As a consequence of the increasing mutual interpentration of the parts 3, said arcs become shorter when progressing upwards from below. The bottom 7 of the kettle 1 consists of equivalent circular segments, which are mainly perpendicular against the axes 4 of the parts 3. Each of said circular segments comprises a circular centre part 8, which is accuratey square against the axes 4, and a marginal part 9 of annular segment shape and inclined obliquely upward, encircling the cetral part. The circular centre parts 8 of the circular segments are tangent to each other in the centre of the kettle bottom 7, where the draining aperture 10 of the kettle is located. The centre parts 8 enclose at their point of tangential contact an angle which equals the angle of inclination between the centre part 8 and the marginal part 9 surrounding it, in each circular segment. At the same time, said angle equals the supplement angle of the angle between the axes 4 of the kettle parts 3.

Each of the cylindrical parts 3 of the cheese kettle 1 is provided with a tool 2 rotating about its axis 4 and with which the cheese mix is agitated and cut into curd particles. Each tool 2 has a shaft 11 located on the axis 4 of the kettle part 3, and treating members 12 on the side of the shaft 11, substantially parallelling the shaft and transversal thereto. The treating members 12 may be e.g. filaments or knives more or less transversal to the direction of rotation of the tool. The tools 2 have been so disposed in the cylindrical kettle parts 3 that the sides of the tools follow, during the rotation, the sides of the kettle consisting of the mantles 5 of the parts and the kettle bottom 7. To make the tools 2 conform accurately to the kettle bottom 7, the side of each tool facing the kettle bottom forms an angle 13 which corresponds to the angle between the centre parts 8 and the marginal parts of the bottom. By the shape and positioning of the tools 2 has been achieved that the cheese mix in the kettle is given a uniform mixing and comminuting treatment which extends to all parts of the treatment space 6.

It is obvious to a person skilled in the art that various embodiments of the invention are not confined to the example presented in the foregoing and that they may vary within the scope of the claims following below.

We claim:

1. A cheese kettle comprising two substantially cylindrical parts each having an upwardly extending central axis, an upwardly extending mantle disposed concentrically about said central axis, said mantle forming the upwardly extending sides of said kettle and being in the form of circular arcs transversely of the central axis, and a bottom extending in a plane perpendicularly of the central axis and extending outwardly toward said sides, a rotary tool located in each of said cylindrical parts for treating the cheese mix, said tools being shaped so that during rotation the tool follows along the bottom and sides of the kettle for affording complete treatment of the cheese mix, the central axes of said cylindrical parts being inclined relative to the vertical toward one another in the direction upwardly from the bottoms thereof with said central axes disposed in spaced relation so that said mantles intersect along two oppositely disposed upwardly extending lines.

2. Cheese kettle, according to claim 1, wherein each said cylindrical part is similarly shaped relative to the other about the central axis thereof.

3. Cheese kettle, as set forth in claim 1, wherein each said tool for treating the cheese mix comprises a shaft centered about and extending upwardly along the central axis of said cylindrical part and treating members secured to and extending outwardly from said shaft with the outer parts of said treating members being located approximately at the sides and the bottom of said cylindrical part so that said treating members move along the sides and bottom of said cylindrical part when the tool is rotated.

4. Cheese kettle, as set forth in claim 3, wherein said treatment members comprise filament-like or knife-like members with certain of said members extending transversely of the shaft and with the other of said members extending parallel to said shaft.

5. Cheese kettle, as set forth in claim 1, wherein the bottom of said kettle comprises a circular part forming a part of the bottom of each said cylindrical part and being disposed at right angles to the central axis of said cylindrical part said circular parts in said cylindrical parts being tangent to one another along the plane extending between and containing the two oppositely disposed upwardly extending lines where said mantles intersect.

6. Cheese kettle, as set forth in claim 5, wherein the bottom of each said circular part includes an annular part extending upwardly from the circular part to said sides and the upward angle formed by said annular part relative to said circular part being equal to the angle between the circular parts in tangential contact or being equal with the supplement angle of the angle enclosed by the axes of said cylindrical parts.

7. Cheese kettle, as set forth in claim 3, wherein the lower end of each said treatment tool located at the bottom of the kettle having a radially inner part parallel to said circular part and a radially outer part parallel to said annular part whereby the radially inner and outer parts form an angle equivalent to the angle between the circular part and the annular part at the bottom of each said cylindrical part.

8. Cheese kettle, as set forth in claim 5, wherein a draining aperture for said kettle is located at the bottom of the kettle at the location where said circular parts are in tangential contact.

* * * * *